Feb. 22, 1949.   C. L. CONROW   2,462,469
ADJUSTABLE BINDER HITCH
Filed Dec. 5, 1945
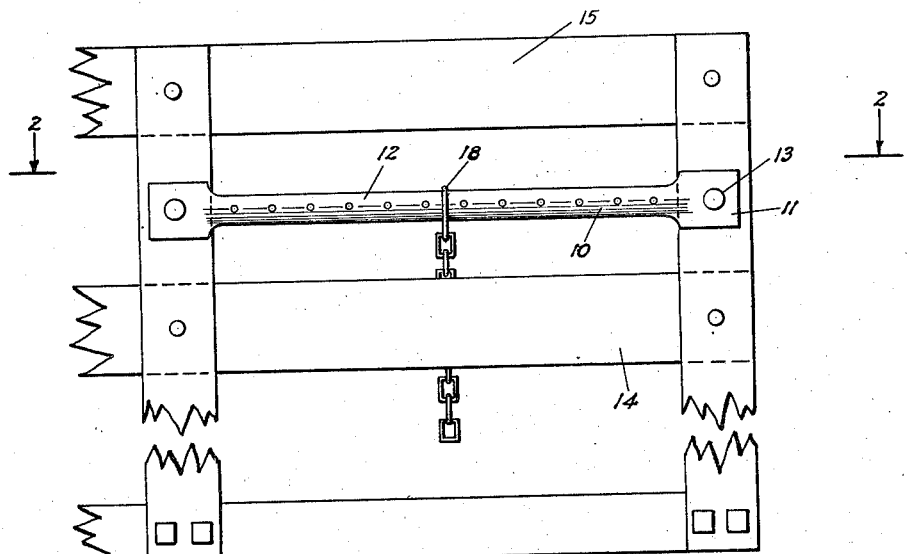
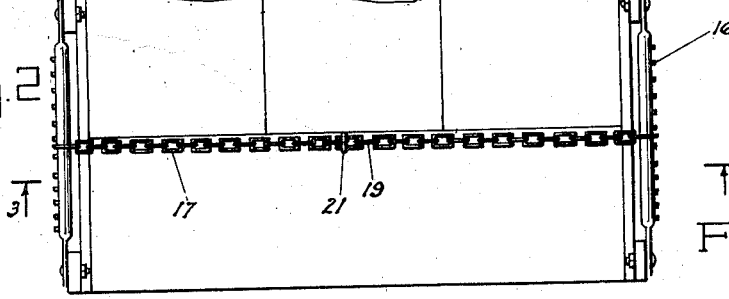
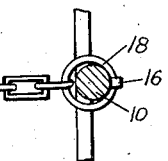
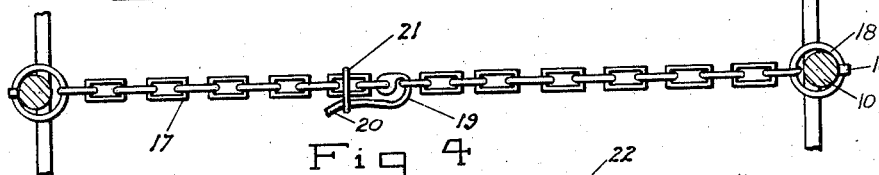
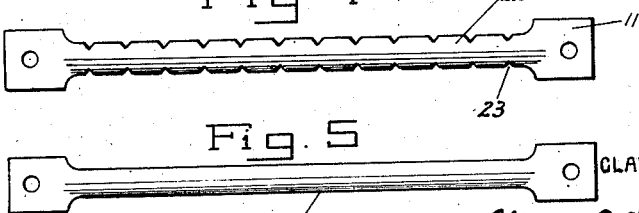
INVENTOR.
CLAYTON L. CONROW
BY Victor J. Evans & Co.
ATTORNEYS Patented Feb. 22, 1949

2,462,469

UNITED STATES PATENT OFFICE 2,462,469

ADJUSTABLE BINDER HITCH

Clayton L. Conrow, Arroyo Grande, Calif.

Application December 5, 1945, Serial No. 633,014

1 Claim. (Cl. 280—179)

The invention relates to a hitch device, and more especially to a load hitch for use on vehicles, such as trucks or the like.

The primary object of the invention is the provision of a hitch of this character, wherein a load upon a vehicle can be secured in place, thereby avoiding slipping of such load while being hauled or otherwise transported from one locality to another during the travel of such vehicle.

Another object of the invention is the provision of a hitch of this character, wherein merchandise carried on a truck or other like vehicle, irrespective of the size of the load of the said merchandise can be held firmly in one position under the load, to avoid damage in shipment, the hitch being readily applied and adjusted in place with ease and dispatch.

A further object of the invention is the provision of a hitch of this character which is simple in construction, thoroughly reliable and efficient in purpose, strong, durable, conveniently handled, quick adjustable, and inexpensive to manufacture and install.

With these and other objects in view, the invention consists in the features of construction, combination and arrangement of parts as will be hereinafter more fully described, illustrated in the accompanying drawing, which shows the preferred and modified forms of construction thereof, and pointed out in the claim hereunto appended.

In the accompanying drawing:

Figure 1 is a fragmentary side elevation of one sideboard of a truck body or the like showing the hitch constructed in accordance with the invention applied;

Figure 2 is a sectional view taken on the line 2—2 of Figure 1 looking in the direction of the arrows;

Figure 3 is a sectional view taken on the line 3—3 of Figure 2 looking in the direction of the arrows;

Figure 4 is an elevation of a modification of the structure;

Figure 5 is a view similar to Figure 4 showing a further modification.

Similar reference characters indicate corresponding parts throughout the several views in the drawing.

Referring to the drawing in detail, particularly Figures 1 to 3, inclusive, the hitch constituting the present invention comprises a pair of racking bars 10, which are provided with terminal ears 11 and an intermediate rounded major portion 12, the ears 11 being made fast by securing means 13 to the opposite sideboards or side panels 14 of a truck body or the like, only a portion of the latter identified at 15 being shown and is of any well known construction.

The bars 10 are parallel with each other and in this instance disposed in a horizontal position, yet they may be otherwise located. The bars 10, each carries at the outer side thereof spaced racking lugs 16 for adjustably anchoring longitudinally thereon hitching means, as hereinafter described.

The hitching means comprises link chain sections 17, each at its outer end carries a loop ring 18, which is of greater diameter than the bar 10 companion thereto, so that when this ring encircles the latter, it can be adjusted over the lugs 16 for disposition with relation to a load as may be carried by the truck body or the like, and held fixed in its adjusted position on such bar. The inner end of one chain section 17 has coupled therewith a hook-like lever latch 19, its lever end 20 being selectively engageable in the links of the other chain section 17 making up the inner end thereof, and this lever is held by a keeper member 21, so that the chain sections will be latched together taut or practically so, for the holding of a load in a firm position on the truck or the like.

In Figure 4 of the drawing, there is shown a slight modification, wherein the bar 22, which is a substitute for the bar 10, is provided with diametrically opposed spaced notches 23 for the engagement of the loop ring thereon under adjustment of the chain sections.

In Figure 5 of the drawing, there is shown a further modification wherein the bar 24 is externally smooth and preferably of tubiform.

What is claimed is:

In a merchandise binder hitch for trucks and the like having side boards including vertical and horizontal elements vertically disposed on the sides of the truck body, the combination, which comprises, a pair of parallel horizontally disposed bars with spaced projections thereon and having mounting flanges at the ends each bar being positioned on opposite sides of the truck body, means mounting said bars through the ends thereof on the vertical members of said side boards, said bars being spaced from the horizontal members and also spaced above the lower ends of the vertical elements of said side boards, a chain having a ring on the upper end mounted on the bar on one side of the truck body with the bar positioned through the ring, and another chain with a ring on the upper end and a fastener on the lower end mounted on the bar on the other side of the truck body with the bar positioned through the ring on the upper end thereof, said chains adapted to be adjusted to selected positions on the bars and fastened together to hold cargo on the truck body.

CLAYTON L. CONROW.

REFERENCES CITED

The following references are of record in the file of this patent:

UNITED STATES PATENTS

| Number | Name | Date |
|---|---|---|
| 362,453 | Lozier | May 3, 1887 |
| 1,170,366 | Torgerson | Feb. 1, 1916 |
| 1,350,632 | Albrecht | Aug. 24, 1920 |